May 2, 1961 H. G. BOLMES 2,982,567
TRAILER COUPLING
Filed May 15, 1957
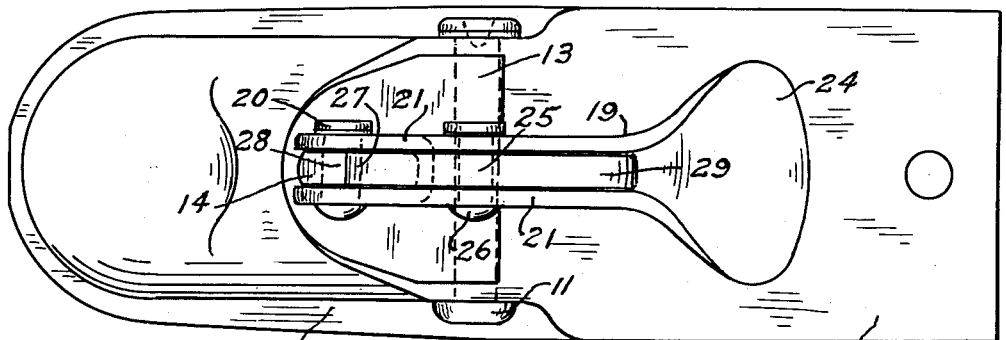
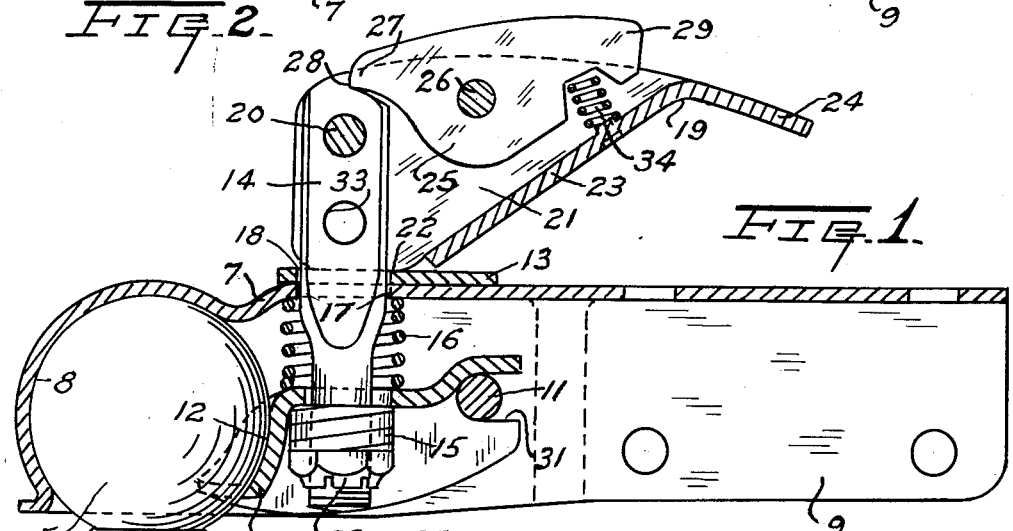
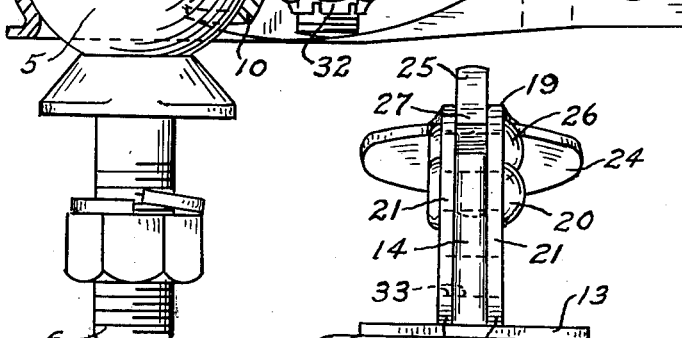
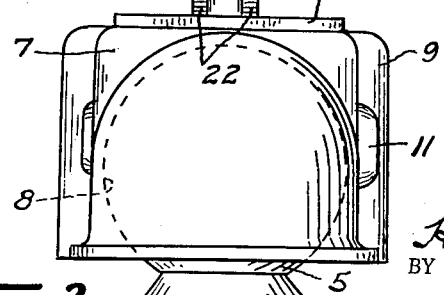
INVENTOR.
H. G. Bolmes
BY Lieber & Lieber
ATTORNEYS.

United States Patent Office 2,982,567
Patented May 2, 1961

2,982,567
TRAILER COUPLING
Henry G. Bolmes, West Allis, Wis., assignor to The Fulton Company, West Allis, Wis., a corporation of Wisconsin
Filed May 15, 1957, Ser. No. 659,404
1 Claim. (Cl. 280—512)

The present invention relates generally to improvements in vehicle couplings, and it relates more specifically to improvements in the construction and operation of ball and socket trailer couplings of the type having a movable ball retainer cooperable with a socket member to hold the ball member within the socket.

The primary object of my invention is to provide a simple, compact and durable ball and socket coupling which is highly effective in operation with utmost safety.

It has heretofore been proposed as shown and described in U.S. Patent No. 2,170,980, granted August 29, 1939 to Joel R. Thorp et al., to provide a ball and socket trailer coupling having a swingable ball retainer operable by a cam lever pivotally attached to a retainer actuating rod and coacting with a bearing plate resting on top of the socket member to swing and maintain the ball retainer in active engagement with the ball member of the coupling. The cam lever of this prior patented coupling was adapted to be normally positively locked into horizontal ball confining condition by means of a padlock, which when released, would permit the cam lever to be swung into upright ball releasing position, and many of these quickly releasable but normally locked coupling assemblages were marketed and successfully used.

In order to avoid necessity of utilizing a padlock and key in order to effect locking of such ball and socket trailer couplings, it has also been frequently proposed to provide some kind of a spring pressed latch carried by the retainer actuating lever and which is adapted to snap into active lever and ball retainer holding condition whenever the lever is swung into such active position. While such an automatically functioning holding latch acts as a safety device when no padlock is employed, it does not prevent unauthorized release of the coupling, and the prior safety latches have all been objectionable either because they were too complicated and difficult to release, or because they protruded from the main retainer actuating lever and were subject to be struck and accidentally actuated to release the coupling members when in normal use.

It is therefore an important object of my invention to provide a quickly releasable ball and socket trailer coupling of the type shown in the above identified prior patent, but embodying an improved cam lever and safety latch which eliminates all of the objectionable features of the prior couplings.

Another important object of this invention is to provide a ball and socket coupling member releasing and connecting cam lever which is extremely durable in construction, and which will not become distorted and ineffective due to the normal abuse to which such couplings are subjected.

A further important object of the invention is to provide an improved automatically functioning holding latch for the cam actuating lever of such ball and socket couplings, which is substantially hidden or concealed within the lever itself and is therefore protected against accidental release while still being readily manipulable to separate the coupling members when desired.

Still another important object of the present invention is to provide an improved ball and socket coupling actuating cam lever and latch assemblage which may be readily constructed at moderate cost, and which functions to insure maximum safety of the coupling to which it is applied.

These and other more specific objects and advantages of the invention will be apparent from the following detailed description.

A clear conception of the features constituting the present improvement, and of the construction and operation of a commercial ball and socket trailer coupling embodying the invention, may be had by referring to the drawing accompanying and forming a part of this specification wherein like reference characters designate the same or similar parts in the several views.

Fig. 1 is a central longitudinal vertical section through the socket member and associated parts of a ball and socket trailer coupling, showing the ball member actively confined within the socket of the socket member;

Fig. 2 is a top view of the coupling assemblage as shown in Fig. 1; and

Fig. 3 is a front end view of the same coupling but with the shank of the ball member mounting bolt broken away.

While the invention has been shown and described herein as having been embodied in an automobile ball and socket trailer coupling of the type wherein the ball member is adapted to be attached to the rear bumper of the hauling vehicle while the socket member is normally secured to the draft tongue of a trailer, it is not the intent to restrict the use of the improved features to such couplings; and it is also contemplated that descriptive terms employed herein be given the broadest interpretation consistent with the disclosure.

Referring to the drawing, the ball and socket trailer coupling shown therein comprises in general, a sphere or ball member 5 having a lower mounting bolt 6; a socket member 7 having a spherical internal zone surface 8 adapted to coact with the front of the ball member 5 and being provided with an inverted U-shaped extension 9 formed for attachment to a trailer draft tongue; a ball retainer 10 swingably suspended from a transverse shaft 11 secured to the side walls of the coupling member 7 and having a spherical zone surface 12 engageable with the rear of the ball member 5 to maintain the ball within the socket formed by the surface 8; a bearing plate 13 resting upon the top of the socket member 7; a ball retainer actuating bolt 14 coacting with the retainer 10 through lower and upper springs 15, 16 respectively, and having an upper flattened portion extending through alined openings 17, 18 in the socket member 7 and bearing plate 13 respectively; a retainer manipulating lever 19 pivotally attached to the upper end of the bolt 14 by a pin 20 and having opposite side walls 21 provided with lower cam surfaces 22 cooperable with the bearing plate 13 and which are contiguous with a lower transverse web 23 formed integral with the walls 21 and extend away from the latter toward the lever manipulating handle 24; and a spring pressed holding latch 25 swingably confined between the lever walls 21 by a pivot pin 26 and having one end 27 cooperable with a notch 28 at the extreme upper end of the bolt 14 while its opposite swinging end 29 extends toward and extends only slightly above the handle 24.

The ball member 5, socket member 7, retainer 10, bearing plate 13, lever 19, and latch 25 may all be formed of durable sheet metal with the aid of punches and dies, and the ball retainer 10 is provided with rear slots 31 coacting with its pivot shaft 11 so that this retainer may swing freely toward and away from the ball member 5 during normal use, but may also be applied to or removed from the shaft 11 when the actuating bolt 14 is withdrawn. The bolt 14 has a nut 32 normally secured and locked to its lower end, and the lower spring 15 which embraces the bolt 14 between the nut 32 and the ball retainer 10 is a relatively strong spring which normally presses the retainer surface 12 with uniform pressure, while the upper spring 16 which is interposed between the retainer 10 and the top of the socket member 7 is much lighter and merely functions to assist gravity in lowering the retainer when the lever 19 is swung into upright inactive position.

The medial flat portion of the rod 14 and the adjacent portions of the walls 21 of the cam lever 19, are also provided with holes 33 which are alined when the lever is in active horizontal position, and these alined holes 33 are adapted to receive a padlock in order to positively lock the ball member 5 within the socket member 7. The horizontal holding latch 25 which is confined between and protected by the side walls 21 of the cam lever 19, has its latching end 27 urged into active latching position by a spring 34 interposed between the web 23 and the opposite end 29 of the latch, and this latch 25 may obviously be readily released by the palm of the hand of an operator grasping the handle 24 of the cam lever 14.

When the improved ball and socket trailer coupling has been properly constructed and assembled as hereinabove described, the ball member 5 may be firmly attached to a draft vehicle with the aid of its mounting bolt 6, and the socket member 7 may be likewise attached to the tongue of a trailer by means of bolts passing through openings in its rear extension 9, in a well known manner. In order to thereafter couple the members 5, 7, it is only necessary for the operator to swing the retainer manipulating cam lever 19 into upright position, whereupon the ball retainer 10 will swing downwardly about the shaft 11 sufficiently to permit the ball member 5 to be inserted within the socket of the member 7. The operator may thereafter swing the lever 19 rearwardly about the pivot 20 into horizontal position as shown in the drawing, whereupon the rod 14 will be elevated by the cam surfaces 22 coacting with the bearing plate 13, and will swing the retainer 10 upwardly about the shaft 11 to cause its spherical zone surface 12 to force the ball into resilient engagement with the socket surface 8.

When the lever 19 approaches its horizontal active condition, the end 27 of the latch 25 will ride over the extreme upper end of the bolt 14, and as the lever 19 reaches its final ball retaining position the spring 34 coacting with the latch 25 becomes effective to automatically swing the latch end 27 into holding engagement with the notch 28 at the upper end of the bolt 14. If so desired, a padlock may also be applied to the alined holes 33 in the rod 14 and lever walls 21; and when it becomes desirable to uncouple the coupling it is only necessary to remove the padlock if used, and for the operator to thereafter grip the lever handle 24 while simultaneously depressing the adjacent latch end 29 and for him to swing the lever 19 forwardly about the pivot 20 into upright position.

From the foregoing detailed description, it should be apparent that the present invention in fact provides a ball and socket coupling which is simple and durable in construction, and readily manipulable to quickly either couple or uncouple the vehicles. Most of the parts of the improved assemblage may be accurately produced of durable sheet metal with the aid of punches and dies, and the improved construction of the actuating lever 19 with sturdy opposite side walls 21 formed integral with a lower transverse inclined web 23 which extends from the handle 24 into close proximity with the cam surfaces 22, not only provides an exceptionally strong lever but also forms an upwardly unobstructed channel space within which the latch 25 is normally confined. The improved formation and disposition of the latch 25 is also important since it eliminates excessive extension or projection of this latch beyond the confines of the lever 19, and which might otherwise be subject to engagement with external objects tending to disengage the latch during normal use of the coupling; but the improved latch 19 is still readily manipulable whenever the operator grasps the lever handle 24. The improved couplings have proven highly satisfactory and successful in actual use, and may be manufactured in various sizes for diverse uses.

It should be understood that it is not desired to limit this invention to the exact details of construction of the trailer coupling herein specifically shown and described, for various modifications within the scope of the appended claim may occur to persons skilled in the art.

I claim:

In a ball and socket trailer coupling of the type having a retractable ball retainer cooperable with a socket member to hold the ball member within the socket, a vertically reciprocable rod element having its lower portion formed for cooperation with the ball retainer to move the latter into active ball retaining position while its upper portion projects upwardly through and beyond the top of the socket member and is provided with a notch at its extreme upper end, a bearing plate surrounding the medial part of said rod and resting upon said socket member top, a one-piece sheet metal lever having laterally spaced side walls provided with lower cam surfaces coacting with said bearing plate and also having a transverse lower web inclined toward and terminating in close proximity to said cam surfaces while being formed integral with the side walls to provide a lever having an upwardly open and unobstructed U-shaped transverse cross-section, said lever walls remote from said cam surfaces being pivotally attached to said rod below said notch and said lever having a manipulating handle formed integral with said side walls and with the upper end of said web and being alternately swingable to cause its cam surfaces to raise said ball retainer into active ball retaining position and to effect release of the retainer, an approximately horizontal locking latch pivotally secured to said lever side walls between said rod and said handle and having one end engageable with said notch to hold said retainer in said active position while its opposite manipulating end is provided with a recess facing said web and is swingable toward the web between said lever side walls directly adjacent to said lever handle, and a helical compression spring interposed between said lever web and said latch recess.

References Cited in the file of this patent

UNITED STATES PATENTS 2,162,052     Bird _____ June 13, 1939
2,726,099     Nunn _____ Dec. 6, 1955